Sept. 25, 1956            G. M. LEES            2,763,996
ICE MAKING MACHINE AND METHOD OF
HYDRAULICALLY HARVESTING ICE Filed Jan. 28, 1953            2 Sheets-Sheet 2

INVENTOR.
Gerald M. Lees
BY Warren P. Horton
Atty.

United States Patent Office 2,763,996
Patented Sept. 25, 1956

2,763,996
ICE MAKING MACHINE AND METHOD OF HYDRAULICALLY HARVESTING ICE

Gerald M. Lees, Chicago, Ill.

Application January 28, 1953, Serial No. 333,714

12 Claims. (Cl. 62—106)

This invention relates generally to the manufacture of ice in relatively small pieces comparable in its product to so-called "flake ice," although not strictly speaking precisely of that character.

In recent years, a considerable market has grown up for ice, either crushed or in the form of flakes, for the purpose of packing and preserving at low temperatures such food products as meat, poultry, fish and the like. There has also been a considerable demand for crushed or flake ice having other purposes including the cooling of beverages and the like. As a result of this demand for crushed or flake ice, there have been a number of ice making machines invented and developed for the manufacture of so-called "flake ice" in relatively large quantities at low ice cost.

It is essential to ice of this character that it be produced economicallly under highly sanitary conditions in view of its use with food, and that the ice product be relatively free from water after it has been produced and while awaiting use.

"Flake ice," as the term is commonly used, includes ice fragments of a variety of sizes and shapes, many of which are not actually flakes but are of relatively small size and the term is used to distinguish generally from ice blocks, ice cubes and "snow ice."

"Flake ice" has generally included ice frozen on a freezing surface and thereafter harvested therefrom as flakes, chips or small pieces.

While there are a number of problems encountered in the manufacture of flake ice, one very difficult problem has been the design of satisfactory means for harvesting the ice from the freezing surface. The most satisfactory solutions of this problem have required mechanism that is initially expensive to manufacture and is therefore most economic in machines of relatively large production in the neighborhood of 6 to 12 tons daily. In many locations where flake ice is of great value, such as in small stores, meat markets and soda fountains, the need does not require such a large daily production, and it has not therefore been economically satisfactory to purchase relatively large production machines for such limited demand.

The machine of my present invention, and the method of ice harvesting, which I have discovered, has all of the objectives of previously used ice making machines in so far as speed of production, cleanliness of product, absence of free water, and economy of production are concerned, but in addition and as an additional object, it provides flake ice machines which may be of small size, so as to occupy only small shop space, and having relatively low outut available, however, at low initial cost and low cost of operation.

Another object of my present invention is to provide a flake ice making machine which is simple in construction, eliminating many of the close manufacturing tolerances required in the manufacture and successful operation of machines with which I am familiar.

Another object is to provide a flake ice making machine which is extremely simple in operation and will require infrequent maintenance and care which can be performed by one who is not specially trained for such service.

Still a further object of my invention is to provide a machine which is very flexible as to size and may very readily be made in such multiple units as would be of high productive capacity.

Yet another object of my invention is to provide an ice making machine wherein the harvesting of ice is accomplished hydraulically without the necessity of providing mechanism to scrape, cut or chip the ice from a surface to which it is frozen.

Various other objects and advantages will become apparent as my invention is more fully disclosed.

The novel features which I believe to be characteristic of my invention are particularly set forth in the claims appended hereto. A physical embodiment of my invention, both as to its construction and method of operation, will best be understood by reference to the following description taken in connection with the accompanying drawings in which:

Figure 1:
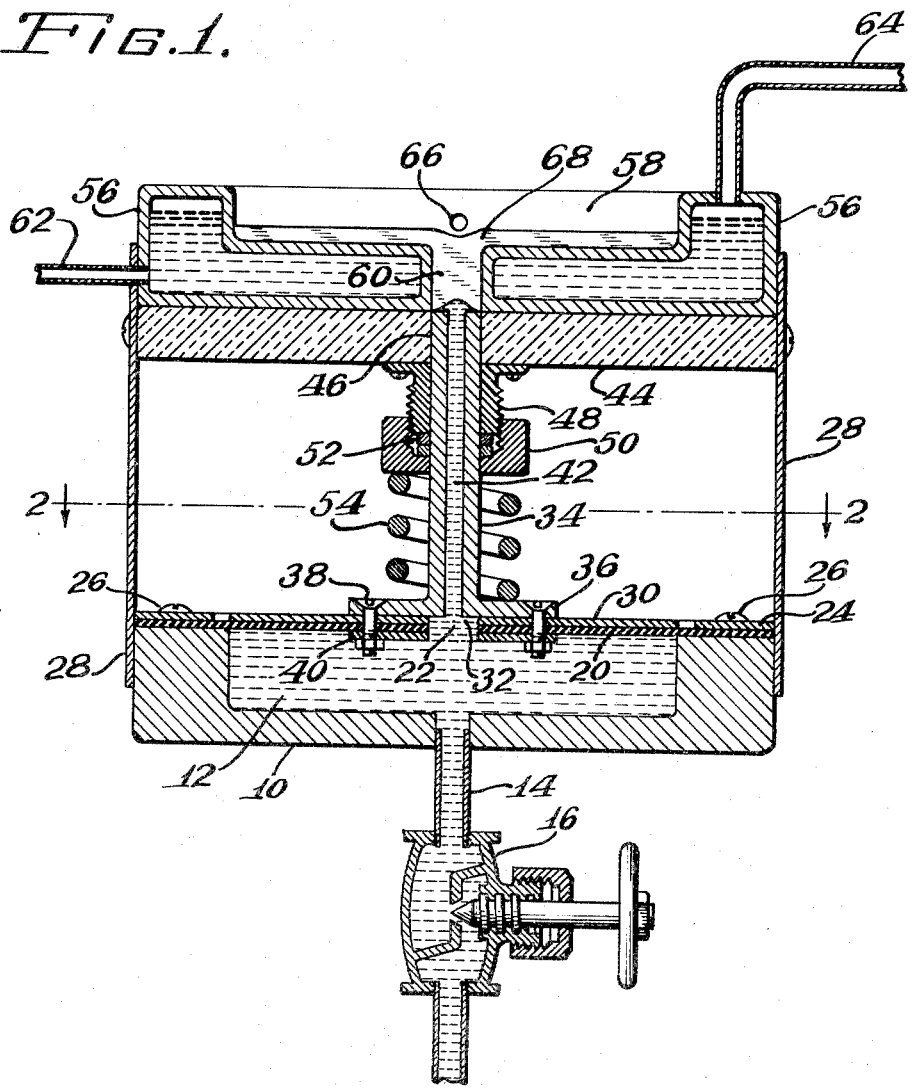
Fig. 1 is a cross sectional view, with some parts in elevation, of the principal parts of an embodiment of my invention.
Figure 2:
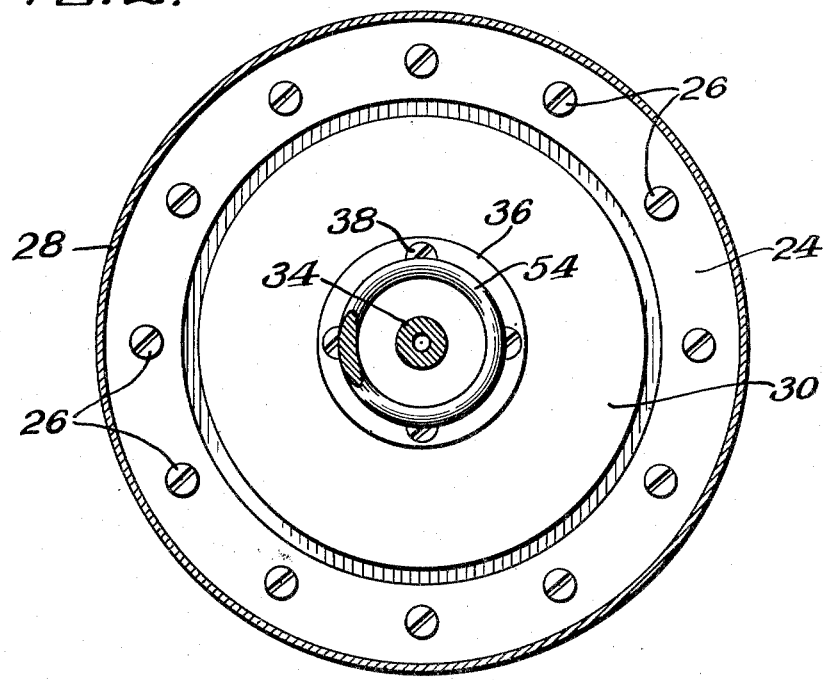
Fig. 2 is a section of the machine taken along the line 2—2 of Fig. 1.
Figure 3:
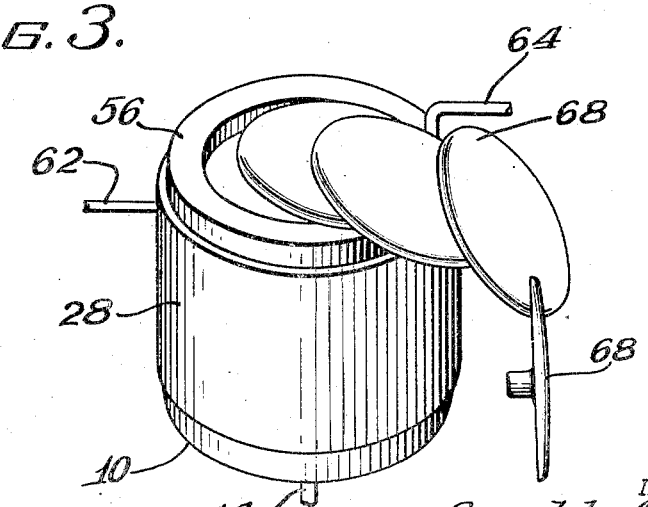
Fig. 3 is a side elevation of my machine showing the ice bodies produced by the unit being ejected and dropped from the side of the machine.

Referring now particularly to Fig. 1, but with the same parts identified by like numerals in the several views, there is shown a base 10 which may be made of any suitable material impervious to water, preferably metal. The base 10 may be of a variety of shapes but as shown is round in a horizontal plane and has a hollow water chamber 12 formed therein. A conduit 14 leads from chamber 12 through a needle valve 16 to pipe 18 which may be a city water line or other water conduit in which water is under pressure of 50 lbs. p. s. i. or thereabouts. The needle valve 16 may be of any type by which one may adjust the water flow into the water chamber 12 with reasonable accuracy.

A rubber diaphragm sheet 20 is mounted on the base 10 so as completely to cover the water chamber 12 except for a central opening 22 to permit the flow of water therethrough. While the diaphragm 20 is desirably made of rubber, of either a natural or synthetic base, it will be obvious that many other deformable materials may be used satisfactorily.

The diaphragm sheet 20 is suitably fastened to the base 10 around the edges of the water chamber 12 and as shown is held to the base by a retaining ring 24 fastened by tap screws 26. Whatever fastening means be used, this juncture would best be water tight and preferably should not extend fully to the edge of the water chamber 12 for reasons which will shortly become apparent.

Mounted upon the base 10 in suitable manner is a frame 28 which may be of sheet metal extending perpendicularly from the outer edge of the base 10. This may desirably be a collar having closed sides to present, a pleasing appearance and so as to be easily cleaned. The retaining ring 24 previously referred to may suitably be affixed to the frame 28 and the frame attached to the base 10 by the tap screws 26.

A backing plate 30 having a diameter substantially coextensive with that of the water chamber 12 and spaced around its circumference a short distance from the retaining ring 24 is mounted on the diaphragm sheet 20 and has a central opening 32 matching the opening 22.

A hollow piston 34 having a circumferential base flange 36 is mounted centrally of the backing plate 30 by retaining bolts 38 or other suitable fastening means which run through and fasten together the flange 36, the backing plate 30, the diaphragm sheet 20 and a ring 40 on the water chamber side of the diaphragm sheet 20. The ring 40 has a central opening matching the opening 22 in the diaphragm sheet.

The hollow piston 34 extends upwardly from its base and is perpendicular thereto. A passage 42 somewhat less in diameter than half the diameter of the opening 22 in diaphragm sheet 20 runs through the hollow piston 34 from end to end. An upper retainer plate 44 is fastened to the frame 28 so as to lie in a horizontal plane parallel to the base 10. The plate 44 is provided with a central opening 46 in which the hollow piston 34 is slidably mounted so that its upper end is flush with the top face of plate 44. An externally threaded bushing 48, slidably mounted around the hollow piston 34, is suitably fastened to the lower face of the upper retainer plate 44. An internally threaded matching bushing 50 slidably mounted around the piston 34 and containing a compressible packing 52 is threaded on the bushing 48. Surrounding the lower portion of the piston 34 and lightly compressed between the lower face of the bushing 50 and the flange 36 is a coil spring 54.

Mounted upon the upper retainer plate 44 and suitably fastened thereto, or to the frame 28, is a hollow evaporator shell 56. This is provided with a dished centrally located freezing chamber 58 in which there is a centrally located well 60, immediately above the hollow piston 34 and having a circumference capable of slidably receiving the upper portion theerof.

A compressor of suitable capacity, not shown but of any one of many well-known types, is in communication with the evaporator shell 56, the refrigerant liquid feed line 62 being shown adjacent the floor of the shell and the refrigerant suction gas line 64 being shown adjacent the top of the evaporator shell 56. Any well-known refrigerant, such for example as Freon, is circulated through the shell 56 in the usual manner.

A water overflow orifice 66 is provided somewhat below the top of the dished freezing chamber 58.

The operation of the machine of the present invention will now be described.

In its initial position, it will be observed that there is a continuous passage from the needle valve 16 to the overflow orifice 66 for the flow of water. When the needle valve 16 is open to a predetermined setting, water, under pressure from the source 18, flows through the conduit 14, fills the water chamber 12, flows upwardly through the hollow piston 34 into the well 60 and thence into the freezing chamber 58 up to the overflow orifice 66 from which any excess water flows out of the machine.

In the meantime, the refrigeration unit has been started and the refrigerant flows through the feed 62 to the interior of the evaporator shell 56 and through the outlet 64 back to the compressor. This will have provided a freezing surface on the bottom and inner sides of the freezing chamber 58 and the sides of the well 60. As water flows into the freezing chamber 58, ice will begin to form on the freezing surfaces until an ice body 68 is formed freezing down into the well 60 and forming an ice body, T-shaped in cross section. It will be characteristic of this ice body that the last portion of it to freeze will be along the line running generally between the top of the ice body and an axial line drawn through the conduit 42 in the hollow piston 34.

As soon as this last portion of the ice body has frozen, the portion within the well 60 will plug the flow of water from the hollow piston 34 and pressure will be immediately built up within the water chamber 12. This pressure operating against the diaphragm 20, and simultaneously against the ice body 68 through the center of the piston 34, raises the diaphragm 20 and its backing plate 30 sliding the piston 34 up against the ice body 68 breaking its adherence to the floor of the freezing chamber 58 and the sides of the well 60. The ice body 68 will then float on fresh water flowing into the freezing chamber 58 and as succeeding ice bodies are formed and ejected, they will fall over the side of the machine into an appropriate collecting pan or basket not shown.

When piston 34 rises under the deformation of diaphragm 20, the spring 54 will be compressed between the bushing 50 and the piston flange 36. When the ice body 68 has been broken free from the freezing surface, the water will flow freely from the water chamber 12 through the hollow piston, reducing the water pressure within the water chamber 12, and the compressed spring 54 will return the piston 34 and thereby the diaphragm 20 to its initial position for the next cycle. Since the ice body 68 is relatively thin and small, it freezes in a very short time and the freezing cycle is constantly repeated at very brief intervals.

It will be observed that I have disclosed a single ice freezing unit which ejects a single ice body on each cycle. It will be obvious, however, that a plurality of such units may be mounted upon a single machine or that a plurality of freezing chambers may be used with but one evaporator and compressor. Thus the ice making machine embodying the present invention may have as few ejectors or as many as desired within the capacity of the compressor.

Obviously by varying the size of the several parts of the machine, the size of the ice bodies ejected may be varied as desired.

While I have shown a freezing chamber which will result in mushroom shaped ice bodies, T-shaped in section, it will be obvious that the precise contours of the freezing chamber may be altered within rather wide limits. As a result, ice bodies of decorative or unique shape may be made which have considerable appeal when used, for example, in serving iced beverages.

While it is apparent that numerous variations may be made in the machine above described without departing from the invention described herein, it is clear that the embodiment disclosed achieves the objects to which reference has been made above.

I claim:

1. An ice making machine comprising an evaporator shell and means to circulate refrigerant therethrough to provide a freezing surface thereon, a water chamber receiving water slowly under pressure, a conduit permitting the flow of water from said water chamber to said freezing surface, the flow of water through said conduit being interrupted by the freezing of ice on said freezing surface, and a movable member actuated by increased pressure within said water chamber to break the bond between said ice and said freezing surface and to open the flow of water through said conduit.

2. An ice making machine comprising an evaporator shell, means to circulate refrigerant therethrough, a freezing chamber formed in said shell having an opening in the bottom thereof, a water conduit receiving water under pressure, means for regulating the flow of water through said conduit, a water chamber receiving water from said conduit, diaphragm means adapted to be moved by an increase of pressure in said chamber and resiliently biased against said movement, and a tubular ram connected at one end to said diaphragm and seated at its other end in said opening of said freezing chamber, the passage in said ram permitting water flow from said chamber into said freezing chamber.

3. An ice making machine comprising a water chamber, means for supplying water under pressure to said chamber, said means including a valve for adjustably restricting the flow of water therethrough, an evaporator shell and means to circulate refrigerant therethrough to provide a freezing surface thereon, a conduit permitting the flow of water from said water chamber to said freezing surface, the flow of water through said conduit being blocked by the freezing of ice on said freezing surface, a movable member actuated by increased pressure within said water chamber to break the bond between said ice and said freezing surface and to unblock the flow of water through said conduit.

4. An ice making machine comprising an evaporator shell and means to circulate refrigerant therethrough to provide a freezing surface thereon, a water chamber receiving water under pressure, a conduit permitting the flow of water from said water chamber to said freezing surface, the flow of water through said conduit being interrupted by the freezing of ice on said freezing surface, and an element having a face situated in said freezing surface and movable with respect thereto to dislodge said ice so as to unblock the flow of water, said element being movable upon an increase in pressure in said water chamber.

5. An ice making machine comprising an evaporator shell and means to circulate refrigerant therethrough, a freezing chamber formed in said shell, a water chamber receiving water under pressure, a conduit permitting the flow of water from said water chamber to said freezing surface, the flow of water through said conduit being interrupted by the freezing of ice in said freezing chamber, and ram means movable upon an increase of pressure in said water chamber and having a portion situated in said freezing chamber to dislodge said ice to unblock the flow of water through said conduit.

6. An ice making machine comprising an evaporator shell, means to circulate refrigerant therethrough, a freezing chamber formed in said shell, a water chamber receiving water under pressure, ram means in said water chamber resiliently biased against expulsive movement, a conduit permitting the flow of water from said water chamber to said freezing chamber adapted to be blocked by the freezing of an ice cake in said chamber, said ram means having a portion bearing against said cake of ice and being movable upon an increase of pressure in said water chamber to dislodge said ice cake to unblock said conduit.

7. An ice making machine comprising an evaporator shell, means to circulate refrigerant therethrough, a freezing chamber formed in said shell having an opening in the bottom thereof, a water chamber receiving water under pressure, a conduit permitting the flow of water from said water chamber to said freezing chamber, said conduit being adapted to be blocked by the freezing of a cake of ice in said freezing chamber, a ram contained in said water chamber and having a shaft extending through said opening in said freezing chamber, said ram being resiliently biased against expulsive movement from said water chamber, and being movable upon an increase in pressure in said water chamber to dislodge said cake of ice to unblock said conduit.

8. An ice making machine comprising an evaporator shell, means to circulate refrigerant therethrough, a freezing chamber formed in said shell having an opening therein, a water chamber receiving water under pressure, ram means movably seated in said water chamber to define one wall thereof, said ram having a portion in said opening of said freezing chamber and a bore therethrough to place said water chamber and said freezing chamber in communication, said bore being adapted to be blocked by the freezing of a cake of ice in said freezing chamber.

9. An ice making machine comprising an evaporator shell, means to circulate refrigerant therethrough, a freezing chamber formed in said shell having an opening therein, a water chamber receiving water under pressure, diaphragm means having a hole therein closing said water chamber, a member secured to said diaphragm and extending into the opening of said freezing chamber, said member having a bore aligned with the hole in said diaphragm to place said water chamber and said freezing chamber in communication, said bore being adapted to be blocked by the freezing of a cake of ice in said freezing chamber, said diaphragm being movable upon an increase in pressure in said water chamber to dislodge said cake of ice to unblock said conduit.

10. An ice making machine comprising an evaporator shell, means to circulate refrigerant therethrough, a freezing chamber formed in said shell having an opening therein, a water chamber receiving water under pressure, diaphragm means having a hole therein closing said water chamber, a member secured to said diaphragm and extending into the opening of said freezing chamber, said member having a bore aligned with the hole in said diaphragm to place said water chamber and said freezing chamber in communication, means resiliently biasing said diaphragm against water pressure in said water chamber, said conduit being adapted to be blocked by the freezing of a cake of ice in said freezing chamber and said diaphragm being movable against said biasing means upon an increase of pressure in said water chamber to dislodge said cake of ice to unblock said conduit.

11. An ice making machine comprising an evaporator shell and means to circulate refrigerant therethrough to provide a freezing surface thereon, a water chamber receiving water under pressure, said water chamber having a movable wall, a member adapted to be moved by said movable wall and extending into said freezing chamber, a conduit permitting the flow of water from said water chamber to said freezing surface, the flow of water through said conduit being interrupted by the freezing of ice on said freezing surface, said movable wall operating to move said member upon an increase of pressure in said water chamber to dislodge said cake of ice and unblock said conduit.

12. A method of making cakes of ice automatically which comprises conducting water slowly and continuously under pressure into a water-filled, water-tight container having a movable wall and thence into a freezing tray through a restricted orifice in the wall thereof, freezing the water in said tray to block said orifice, said blockage causing an increase in pressure in said container to move said wall, and dislodging said ice cake by said movement of said wall to open said orifice.

References Cited in the file of this patent

UNITED STATES PATENTS

| Number | Name | Date |
|---|---|---|
| 191,256 | Riker | May 29, 1877 |
| 2,071,465 | Huber | Feb. 23, 1937 |
| 2,133,521 | Wussow | Oct. 18, 1938 |
| 2,145,773 | Muffly | Jan. 31, 1939 |
| 2,278,229 | Whitaker | Mar 31, 1942 |
| 2,374,997 | Hill | May 1, 1945 |
| 2,422,772 | Bohn | June 24, 1947 |
| 2,471,655 | Rundell | May 31, 1949 |
| 2,542,891 | Bayston | Feb. 20, 1951 |
| 2,571,506 | Watt | Oct. 16, 1951 |
| 2,595,588 | Lee | May 6, 1952 |
| 2,597,008 | Lee | May 20, 1952 |
| 2,613,511 | Walsh | Oct. 14, 1952 |
| 2,639,594 | Watt | May 26, 1953 |